US009185762B2

(12) United States Patent  
Mark et al.

(10) Patent No.: US 9,185,762 B2  
(45) Date of Patent: Nov. 10, 2015

(54) TIME OF FLIGHT ILLUMINATION CIRCUIT

(71) Applicant: Infineon Technologies AG, Neubiberg (DE)

(72) Inventors: Michael Mark, Graz (AT); Markus Dielacher, Graz (AT); Martin Flatscher, Graz (AT); Josef Prainsack, Graz (AT)

(73) Assignee: Infineon Technologies AG, Neubiberg (DE)

( * ) Notice: Subject to any disclaimer, the term of this patent is extended or adjusted under 35 U.S.C. 154(b) by 71 days.

(21) Appl. No.: 13/866,461

(22) Filed: Apr. 19, 2013

(65) Prior Publication Data

US 2014/0312233 A1 Oct. 23, 2014

(51) Int. Cl.
*G01J 5/02* (2006.01)
*H05B 33/08* (2006.01)
*G01J 5/10* (2006.01)
*G01J 1/46* (2006.01)

(52) U.S. Cl.
CPC ............... *H05B 33/0845* (2013.01); *G01J 1/46* (2013.01); *G01J 5/10* (2013.01); *H05B 33/0842* (2013.01)

(58) Field of Classification Search
CPC ... H05B 33/0845; H05B 33/0842; G01J 1/46; G01J 5/10

USPC ......................................................... 250/341.8
See application file for complete search history.

(56) References Cited

U.S. PATENT DOCUMENTS

| 4,571,506 | A  | * | 2/1986  | Lisco ............................ 327/109 |
| 5,177,755 | A  |   | 1/1993  | Johnson |
| 6,597,209 | B2 |   | 7/2003  | Iguchi et al. |
| 6,914,387 | B2 |   | 7/2005  | Sato et al. |
| 2009/0315484 | A1 |   | 12/2009 | Cegnar et al. |
| 2014/0211192 | A1 | * | 7/2014  | Grootjans et al. ........... 356/5.01 |

* cited by examiner

*Primary Examiner* — David Porta
*Assistant Examiner* — Edwin Gunberg
(74) *Attorney, Agent, or Firm* — Eschweiler & Associates, LLC

(57) ABSTRACT

Some aspects of the present disclosure provide system and method of operation of a driving circuit for a light emitting element in a Time-of-Flight (ToF) camera. A DC-DC converter is configured to emit a constant current, and is coupled in parallel to a first modulation switch configured to connect the driving circuit to ground. The first modulation switch is further configured to alternate connections between the current source and ground at a frequency in a desired range of operation to produce an AC current. In some embodiments, an RC circuit element is coupled to an output electrode of the light emitting element and configured to apply a reverse bias to decrease turn-off time of the light emitting element. In some embodiments, a second modulation switch is coupled to the output electrode and configured to apply the reverse bias across the light emitting element. Other systems and methods are also disclosed.

20 Claims, 6 Drawing Sheets

TIME OF FLIGHT ILLUMINATION CIRCUIT

BACKGROUND

Time-of-flight (ToF) sensors emit a modulated light signal which is reflected by a nearby object and gathered by an image sensor made up of a matrix of PMDs (Photon Mixing Devices) that resolve the object in real time. Each PMD evaluates the distance to a point on the nearby object by determining a phase shift between the emitted light signal and a reflected light signal. The composite information gathered across the matrix PMDs can be used for such applications as automobile crash detection systems, 3-dimensional imaging, video game interfaces, and robotics, among others.

DETAILED DESCRIPTION

Figure 1:
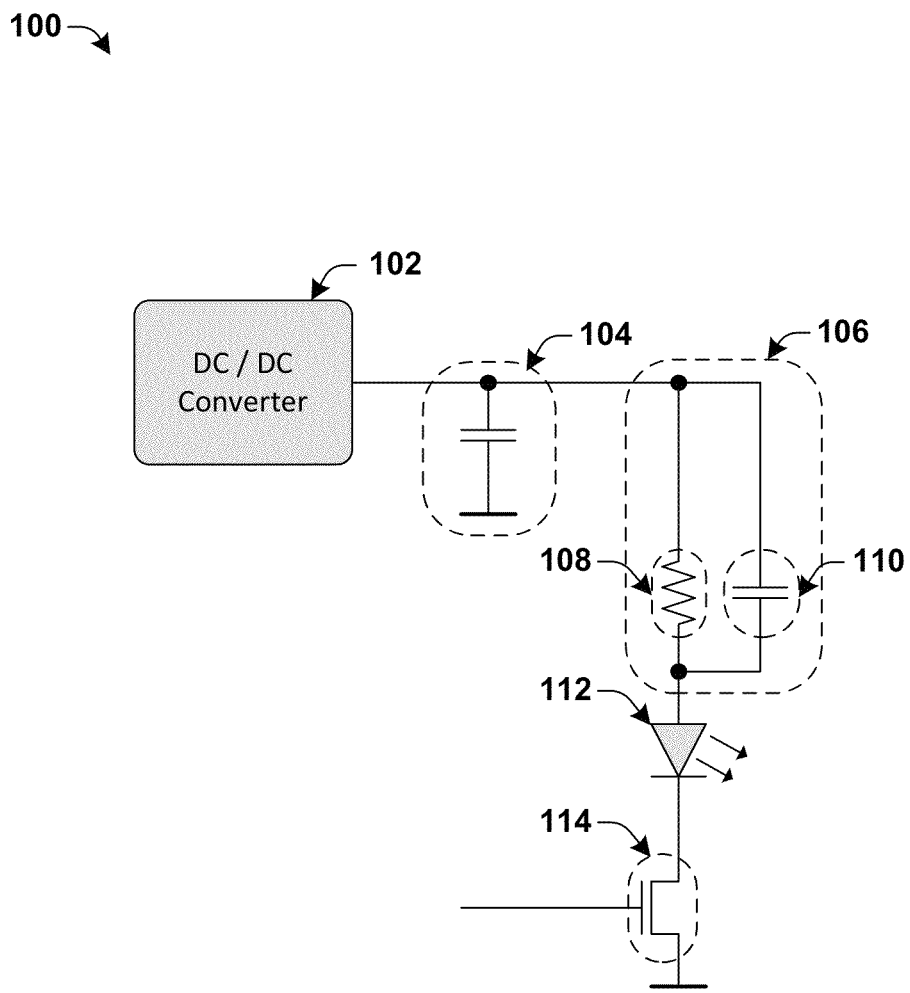
FIG. 1 illustrates a driving circuit for a light emitting element.

The description herein is made with reference to the drawings, wherein like reference numerals are generally utilized to refer to like elements throughout, and wherein the various structures are not necessarily drawn to scale. In the following description, for purposes of explanation, numerous specific details are set forth in order to facilitate understanding. It may be evident, however, to one skilled in the art, that one or more aspects described herein may be practiced with a lesser degree of these specific details. In other instances, known structures and devices are shown in block diagram form to facilitate understanding.

Time-of-flight (ToF) measurement utilizes the known speed of light to determine a distance to a nearby object. ToF measurement has found applications in automobile crash detection systems, 3-dimensional (3D) imaging, video game interfaces, robotics, and the like. In some applications, a ToF measurement system emits a modulated infrared signal and determines a distance to a nearby object by measuring a phase shift of a reflected signal, wherein the reflected signal is reflected by the nearby object. The distance resolution of a modulated ToF camera is determined by the frequency with which the modulated infrared signal can be generated (i.e., a higher frequency gives higher resolution).

FIG. 1 illustrates a driving circuit 100 for a light emitting element comprising a light emitting diode (LED) 112. The driving circuit 100 comprises a DC-DC converter 102 configured to adjust an input voltage to a desired operational voltage, a blocking capacitor 104 configured to decouple the DC-DC converter 102 during switching, an RC circuit element 106 further comprising a resistor 108 configured in parallel with a capacitor 110, and a modulation switch 114 further comprising an n-type field-effect transistor (nFET). The modulation switch 114 is configured to enable current flow through the LED 112 when a voltage is applied to a gate of the modulation switch 114, switching the modulation switch 114 on. When no voltage is applied, current flow through the LED 112 is disabled, switching the modulation switch 114 off.

A turn-on time of the LED 112 is decreased by the RC circuit element 106. When the modulation switch 114 is switched on by enabling a voltage to the gate of the modulation switch 114, a voltage drop across the resistor 108 and capacitor 110 is zero, because the capacitor 110 is fully discharged when the driving circuit 100 is off. As a result, the LED 112 is directly connected to the supply voltage such that additional current is forced into the LED 112 until the capacitor 110 is fully charged. While the turn-on time is enhanced by such means, the driving circuit 100 contains no mechanism to decrease a turn-off time of the LED 112 to further enhance distance resolution. Additionally, the blocking capacitor 104 can cost considerable area relative to the other driver components, and moreover does not scale with the other components. Some contemporary driving circuits can enhance turn-off time by applying a reverse bias to the LED 112. In these driving circuits, the supply voltage of the DC-DC converter 102 still requires a blocking capacitor 104 for decoupling, which limits scalability. Additionally, synchronizing two switches requires additional circuitry and additional timing constraints for signals traveling along different paths, as well as increasing the complexity of the driving circuit 100.

Accordingly, some aspects of the present disclosure provide system and method of operation of a driving circuit for a light emitting element in a ToF camera. A DC-DC converter is configured to emit a constant current, and is coupled in parallel to a first modulation switch configured to connect the driving circuit to ground. The first modulation switch is further configured to alternate connections between the current source and ground at a frequency in a desired range of operation to produce an AC current. In some embodiments, an RC circuit element is coupled to an output electrode of the light emitting element and configured to apply a reverse bias to decrease turn-off time of the light emitting element. In some embodiments, a second modulation switch is coupled to the output electrode and configured to apply the reverse bias across the light emitting element. Other systems and methods are also disclosed.

Figure 2A:
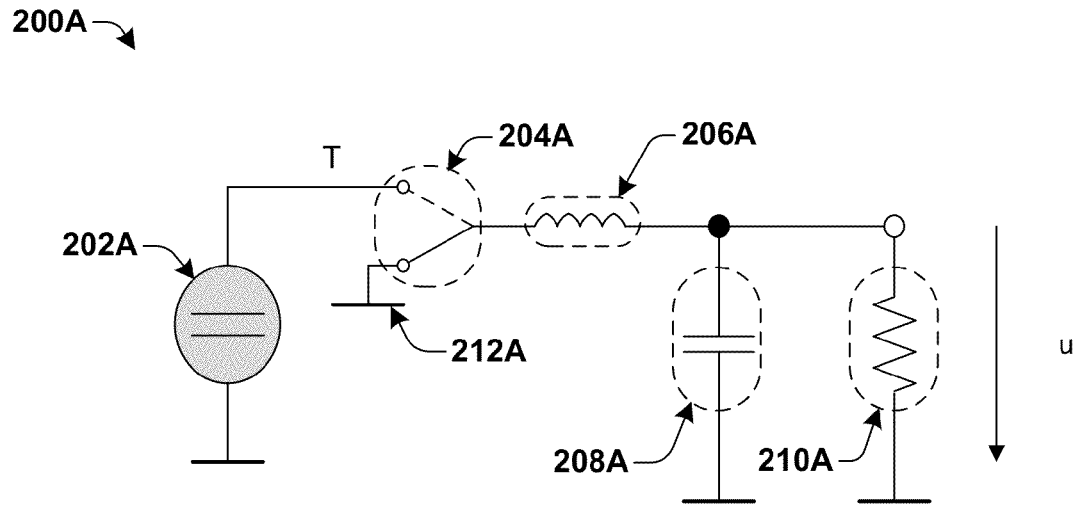
FIG. 2A illustrates some embodiments of a constant voltage DC-DC converter.

FIG. 2A illustrates some embodiments of a constant voltage DC-DC converter 200A comprising an input voltage source 202A, a power switch 204A configured to enable input power, an inductor 206A, and a blocking capacitor 208A. The power switch 204A is configured to connect the constant voltage DC-DC converter 200A to the inductor 206A or to ground 212A, respectively. The combined inductor 206A and the blocking capacitor 208A comprise a low pass filter to an input voltage of the input voltage source 202A. A resultant output of the constant voltage DC-DC converter 200A is an average of a rectangular input wave at the power switch 204A output (i.e., averaged signal between and on and off states of the DC-DC converter 200A). An output voltage of the constant voltage DC-DC converter 200A is determined by the duty cycle of the power switch 204A. Typically the output voltage is monitored and the duty cycle of the power switch 204A is adjusted appropriate to a given application. For this purpose several controlling techniques exist, such as continuous conduction mode (CCM) and discontinuous conduction mode (DCM). In general the constant voltage DC-DC converter comprises a second order loop due to the low pass filter geometry of the inductor 206A and the blocking capacitor 208A. The resistor 210A represents a load on the constant voltage DC-DC converter 200A (i.e., the load of a light emitting element and a modulation switch discussed in subsequent embodiments).

Figure 2B:
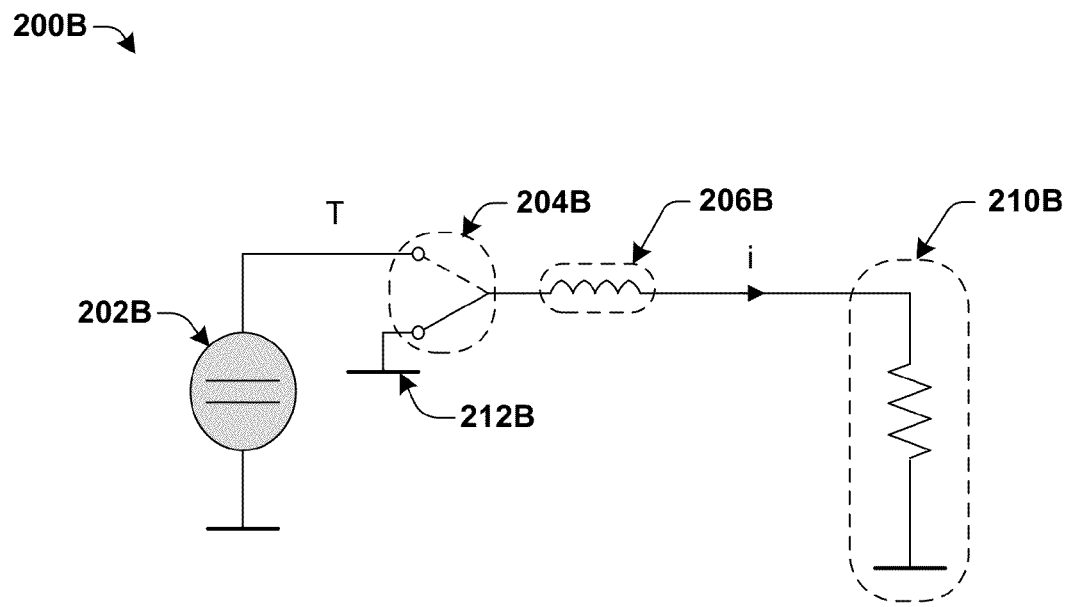
FIG. 2B illustrates some embodiments of a constant current DC-DC converter.

FIG. 2B illustrates some embodiments of a constant current DC-DC converter 200B comprising an input voltage 202B, a power switch 204B, an inductor 206B, and a resistor 210B representing the load on the constant current DC-DC converter 200B. The circuit in FIG. 2B is the DC/DC converter 200B configured as a current source. The power switch 204B connects the input voltage 202B to the inductor 206B or to ground 212B. A current through the inductor 206B is proportional to the integral of the voltage drop across the inductor 206B (i.e., the average) and thus is determined by a duty cycle of the power switch 204B. The current is monitored by a controller (not shown) and the duty cycle is adjusted accordingly. For the embodiments of constant current DC-DC converter 200B the average is generated by using an inductor 206B as opposed to a LC low pass of the embodiments of FIG. 2A. The DC/DC converter 200B thus theoretically comprises a first order loop. However, in practice the DC/DC converter 200B can be second order as well due to current sensing.

In some embodiments the requirements for ToF applications comprise an AC frequency range of approximately 1 MHz to 100 MHz with an output optical power of several Watts. Fast turn-on times and fast turn-off times for a light emitting element comprising an LED or a laser can improve the distance resolution of a modulated ToF camera. To drive fast turn-on times for the light emitting element, an "overshoot voltage" may be used, wherein a constant current is set to a value larger than a required threshold value an applied to an input electrode of the light emitting element (e.g., an anode of the LED). Fast turn-off times may be achieved by applying a positive voltage an output electrode of the light emitting element (e.g., a cathode of an LED), thus proving a reverse bias to achieve an off mode of the LED.

Figure 3A:
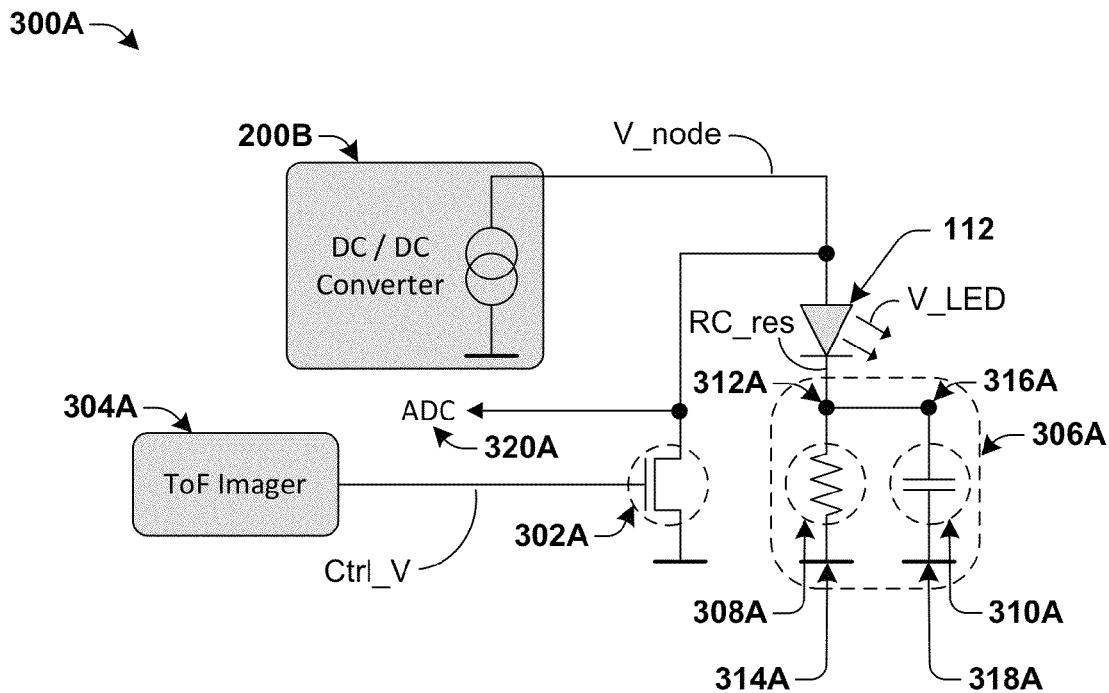
FIG. 3A illustrates some embodiments of a driving circuit for a light emitting element comprising an RC circuit element.

FIG. 3A illustrates some embodiments of a driving circuit 300A for an LED 112, comprising a current source further comprising a constant current DC-DC converter 200B coupled to an anode of the LED 112, wherein the DC-DC converter 200B is configured to provide a forward bias to the LED 112. A first modulation switch 302A is coupled to the anode of the LED 112 and configured to enable a modulated AC current at a frequency to bias the LED 112. For the embodiments of driving circuit 300A, the first modulation switch 302A comprises an n-type field-effect transistor (nFET), but in general may comprise a p-type field-effect transistor (pFET), a combination of one or more nFETs and pFETs, or any device which may prevent the constant current from reaching the anode of the LED 112. The first modulation switch 302A is coupled to a ToF imager 304A, which controls the first modulation switch 302A by applying a control voltage (Ctrl_V) to a gate of the modulation switch 302A. When the control voltage is applied to the modulation switch 302A, an output current of the constant current DC-DC converter 200B is provided a path to ground, and the LED 112 is not active. When the control voltage is not applied to the modulation switch 302A, the output current of the constant current DC-DC converter 200B has no path to ground and flows to the anode of the LED 112. Therefore, for some embodiments of a driving circuit 300A, applying no control voltage to the first modulation switch 302A comprises enabling the output current of the constant current DC-DC converter 200B to bias the LED 112 at the desired frequency. A resulting voltage across the LED 112 (V_LED) then produces a modulated light signal at the frequency.

The driving circuit 300A further comprises an RC circuit element 306A coupled to a cathode of the LED 112 and configured to apply a positive voltage to the cathode to reverse bias the LED 112 to achieve a fast turn-off time of the LED 112. The RC circuit element 306A further comprises a resistor 308A and the capacitor 310A configured in parallel. The resistor 308A comprises a first resistor node 312A coupled to the cathode of the LED 112 and a second resistor node 314A coupled to ground. The capacitor 310A comprises a first capacitor node 316A coupled to the cathode of the LED 112 and a second capacitor node 318A coupled to ground. When the first modulation switch 302A is turned off, the voltage drop induced across the resistor 308A is stored in the capacitor 310A. When the first modulation switch 302A is turned on, the stored voltage in the capacitor 310A starts to discharge, temporarily creating a reverse bias across LED 112, and thus decreasing the turn off time of the LED 112.

The "overshoot voltage" provided by the constant current DC-DC converter 200B to the anode of the LED 112 decreases the turn-on time of the LED 112, whereas the aforementioned reverse bias applied to the LED 112 by the RC circuit element 306A decreases the turn-off time of the LED 112. A (single) first modulation switch 302A eliminates the timing issues seen in prior art approaches comprising multiple modulation switches. The driving circuit 300A also achieves a diode current that is independent of a threshold voltage of the LED 112, making the transmitted optical power independent from temperature (alleviating overheating of the LED 112 that could result in a thermal failure of the LED 112). The constant current DC-DC converter 200B drives the LED 112 with a current as opposed to a voltage. As a result, no blocking capacitor is required for decoupling. This saves die area and increases scalability over some other prior art circuits. Some prior art circuits utilize a supply voltage of greater than approximately 10 V, wherein the first modulation switch 302A must withstand the supply voltage. For the embodiments of driving circuit 300A, the voltage at the first modulation switch 302A is composed of a voltage of the LED 112 (e.g., approximately 2 V) and a voltage of the resistor 308A (e.g., approximately 1 V).

Figure 3B:
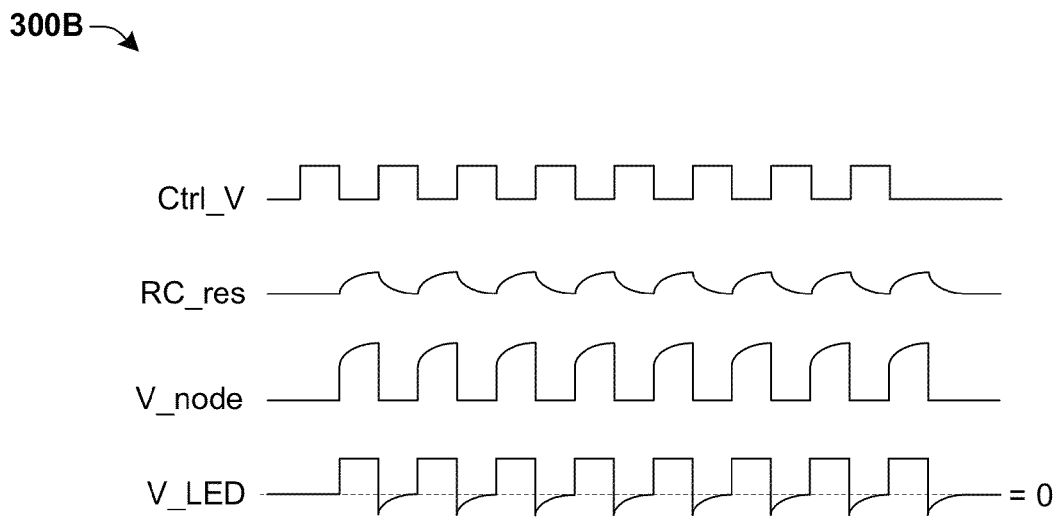
FIG. 3B illustrates a timing diagram for some embodiments of the driving circuit of FIG. 3A.

FIG. 3B illustrates a timing diagram 300B for some embodiments of the driving circuit of FIG. 3A. If the control voltage (Ctrl_V) is zero, the first modulation switch 302A comprising a transistor is not conducting. The constant current is forced through the LED 112 and causes a constant voltage drop across the LED 112. Additionally, the current is forced through the resistor 308A and capacitor 310A connected in parallel. After a predetermined time the voltage of the capacitor 310A is charged to a value. When the first modulation switch 302A is turned on, the voltage at the anode and the cathode of the LED 112 (V_node) is forced to zero and the voltage at the capacitor 310A is discharged. The voltage across the LED 112 is negative, because the sum of RC_res and voltage across LED 112 is V_node, which is zero. After a predetermined time the voltage of the capacitor 310A is zero.

Figure 4A:
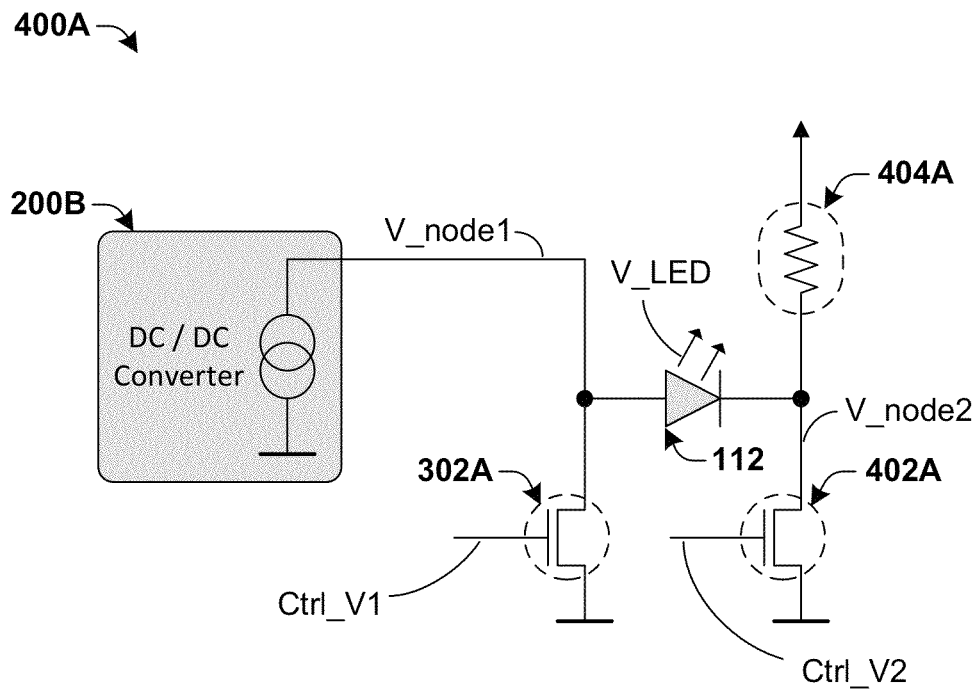
FIG. 4A illustrates some embodiments of a driving circuit for a light emitting element comprising a second modulation switch.

FIG. 4A illustrates some embodiments of a driving circuit 400A for an LED 112, wherein the RC circuit element 306A of the embodiments of FIG. 3A has been replaced by a second modulation switch 402A. A constant current DC-DC converter 200B provides an output current to the LED 112, which is controlled by the first modulation switch 302A comprising an nFET. A first control voltage (Ctrl_V1) is applied to a gate of the first modulation switch 302A to divert current away from the anode of the LED 112 to ground, effectively turning-off the LED 112. In this mode the gate of the second modulation switch 402A is forced to ground. Therefore, the cathode is connected to a constant voltage power supply via a resistor 404A, and a reverse bias is applied across the LED 112. The reverse bias helps to achieve a fast turn-off time of the LED 112. Removal of the first control voltage allows current to flow through the LED 112, effectively turning-on the LED 112. In this mode a second control voltage (Ctrl_V2) is applied to a gate of the second modulation switch 402A, wherein current flows through the LED 112 and the second modulation switch 402A.

In some embodiments, the first modulation switch 302A of the driving circuit 400A comprises a first n-type field-effect transistor further comprising a first diffusion coupled to the anode of the LED 112, a second diffusion coupled to ground, and a first gate configured to receive the first control voltage to allow current flow between the first diffusion (e.g., source) and the second diffusion (e.g., drain), thereby diverting the constant current from the LED 112 to ground. In some embodiments, the second modulation switch 402A of the driving circuit 400A comprises a second n-type field-effect transistor further comprising a third diffusion coupled to the cathode of the LED 112, a fourth diffusion coupled to ground, and a second gate configured to receive the second control voltage to allow current flow between the third diffusion (e.g., source) and the fourth diffusion (e.g., drain), thereby providing the positive voltage to the cathode.

Figure 4B:
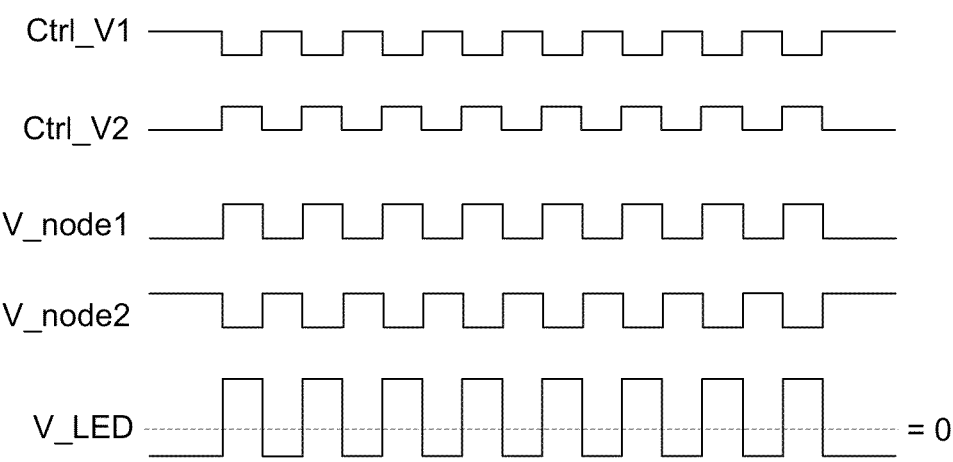
FIG. 4B illustrates a timing diagram for some embodiments of the driving circuit of FIG. 4A.

FIG. 4B illustrates a timing diagram 400B for some embodiments of the driving circuit of FIG. 4A. The first control voltage (Ctrl_V1) comprises a first control signal for the first modulation switch 302A. The second control voltage (Ctrl_V2) comprises a second control signal for the second modulation switch 402A. The voltage across the LED 112 (V_LED) is equal to a difference between a first voltage at the anode of the LED 112 (V_node1) and a second voltage at the cathode of the LED 112 (V_node2), which comprises a signal with a response similar to that of V_node1 (and Crtl_V2), but can also provide a reverse bias across the LED 112 to promote fast turn off of LED 112.

Figure 5:
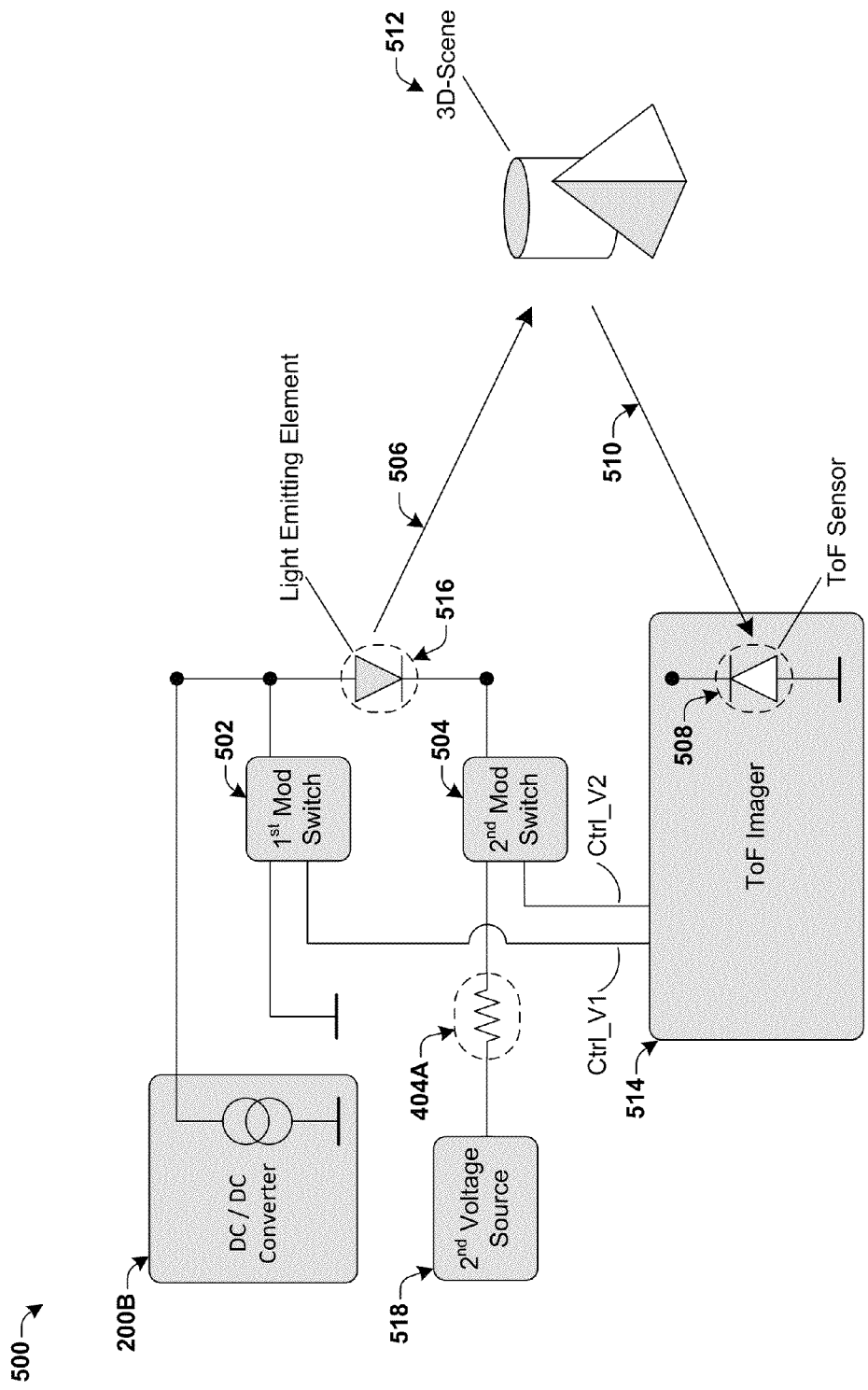
FIG. 5 illustrates some embodiments of a time-of-flight detector comprising the driving circuit of FIG. 4.

FIG. 5 illustrates some embodiments of a time-of-flight (ToF) detector 500 comprising the driving circuit of FIG. 4A. A constant current DC-DC converter 200B provides an output current to an light emitting element 516, which is controlled by a first modulation switch 502, the first modulation switch 502 controlling delivery of an output current of the constant current DC-DC converter 200B to an input electrode of the light emitting element 516 to provide a forward bias to the light emitting element 516. A second modulation switch 504 is coupled to an output electrode of the light emitting element 516 and configured to apply a positive voltage to the output electrode from a second voltage source 518 coupled to the second modulation switch 504 through a resistive element comprising a resistor 404A to reverse bias the light emitting diode 516.

If the input electrode of the light emitting element 516 is connected to a positive voltage and the output electrode of the light emitting element 516 is connected to ground, then the light emitting element 516 is forward biased. The voltage across the light emitting element 516 is positive and the light emitting element 516 emits light. If the output electrode is connected to a positive voltage and the input electrode is connected to ground, then the light emitting element 516 is reverse biased. The voltage applied to the input electrode minus the voltage applied to the output electrode (V_in–V_out) is negative, and the light emitting element 516 stops emitting light. As a result, the driving circuit (400A) of the ToF detector 500 requires 2 switches (to connect the input electrode and the output electrode to ground). In the driving circuit (400A) a forward bias used, and a second voltage connected via the resistor 404A to the output electrode allows for a reverse bias. For the embodiments of the ToF detector 500, the first modulation switch 502 and the second modulation switch comprise nFETs, but in general may comprise a pFETs, a combination of one or more nFETs and pFETs, or a device to divert current flow away from the input electrode and output electrode of the light emitting element 516, respectively. In some embodiments the light emitting element 516 comprises and LED, wherein the input electrode of the LED comprises an anode and the output electrode of the LED comprises a cathode. In some embodiments the light emitting element 516 comprises and laser, wherein the input electrode of the laser comprises a power connection to the laser, and the output electrode of the laser comprises a ground connection to the laser.

In some embodiments, the first modulation switch 502 is configured to enable the constant current from the driving circuit (400A) to bias the light emitting element 516 at a frequency to provide AC source to illuminate the light emitting element 516 at the frequency. The second modulation switch 504 is further configured to alternate between application of a positive bias from the second voltage source 518 and ground to the output electrode of the light emitting element 516 at the frequency to reverse bias the light emitting element at the frequency. The second modulation switch 504 is configured to reverse bias the light emitting element 516 when the first modulation switch 502 connects the driving circuit (400A) to ground. The second modulation switch 504 is further configured to connect to ground when the first modulation switch 502 enables the constant current to forward bias the light emitting element 516.

The light emitting element 516 is configured to emit a first modulated light signal 506. The ToF detector 500 further comprises a ToF sensor 508 configured to receive a second modulated light signal 510, wherein the second modulated light signal 510 comprises a first modulated light signal 506 that has been reflected off of one or more nearby objects 512 (e.g., a "3D scene"). A ToF imager 514 comprises the ToF sensor 508 and is configured to provide a first control voltage (Ctrl_V1) to the first modulation switch 502 and a second control voltage (Ctrl_V2) to the second modulation switch 504. The first modulated light signal 506 is proportional to Ctrl_V1 or Ctrl_V2 (or to the inverse of Ctrl_V1 or Ctrl_V2). In some embodiments, the ToF sensor 508 converts the second modulated light signal 510 into a modulated electrical signal. Therefore, the ToF imager 514 can measure the distance to the one or more nearby objects 512 by measuring the phase shift between the modulated electrical signal and Ctrl_V1 or Ctrl_V2. In some embodiments, the ToF sensor 508 directly provides a signal which is proportional to the phase shift between the second modulated light signal 510 and control signals Ctrl_V1 or Ctrl_V2 by multiplying the optical input signal (i.e., the second modulated light signal 510) with an electrical reference signal resulting in a photon mixing device (PMD). Therefore, the modulated electrical signal is only available for use by the ToF sensor 508, wherein the ToF sensor 508 determines the delay and provides an output signal which is proportional to the phase shift, delay, distance.

Note that between the emitted first modulated light signal 506 and the control signals Ctrl_V1 or Ctrl_V2 there can be an unwanted delay. This delay can be measured, by using an analog-to-digital converter (ADC) connected to the LED (see item 320A of FIG. 3A).

The ToF imager 514 is configured to determine a phase shift between the first modulated light signal 506 and the second modulated light signal 510, thereby determining a distance to a point on the one or more nearby objects 512 from where the first modulated light signal 506 was reflected. The ToF imager 514 can use this information to construct a 3D image of the nearby objects 512, for proximity detection in pre-crash detection systems in automobiles, etc.

Figure 6:
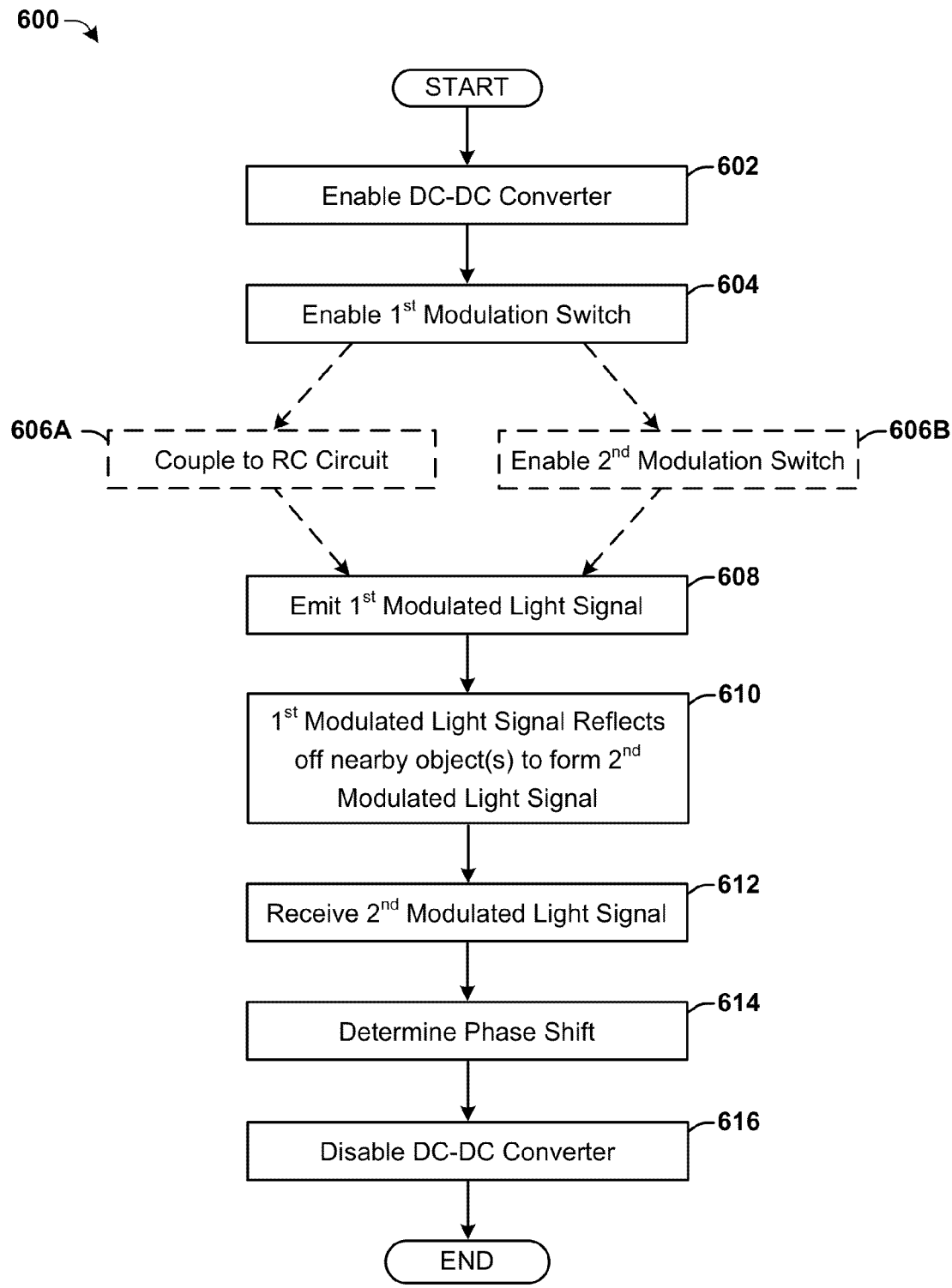
FIG. 6 illustrates a block diagram of some embodiments of a method to operate a time-of-flight detector comprising RC circuit element or comprising a second modulation switch.

FIG. 6 illustrates a block diagram of some embodiments of a method 600 to operate a ToF detector comprising RC circuit element or comprising a second modulation switch. It will be appreciated that while the method 600 is illustrated and described as a series of acts or events, that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases. Furthermore, the disclosed methods may be implemented as an apparatus, or article of manufacture using standard programming and/or engineering techniques to produce software, firmware, hardware, or any combination thereof to control a computer to implement the disclosed subject matter.

At 602 a DC-DC converter is enabled. The DC-DC converter is configured to provide a constant current to a first modulation switch coupled to an input electrode of a light emitting element, the input electrode further comprising an anode of an LED or a power connection to a laser. The first modulation switch is configured to alternate connections between the output power of the DC-DC converter and ground at a frequency (e.g., an AC frequency for illumination).

At 604 a first squared wave control voltage is applied to the first modulation switch to provide an AC current to the input electrode of the light emitting element to forward bias the light emitting element at the frequency.

In some embodiments, an output electrode of the light emitting element comprises a cathode for an LED, or a ground connection for a laser. The output electrode is coupled to an RC circuit element comprising a resistor and the capacitor configured in parallel between the output electrode and ground. At 606A a reverse bias is applied to the across the light emitting element at the frequency in a manner of the embodiments of FIG. 3A-3B. The reverse bias helps to divert current away from the output electrode of the light emitting element to decrease a turn-off time of the light emitting element.

In some embodiments, the output electrode of the light emitting element is coupled to a second modulation switch configured to apply the reverse bias at the frequency to turn-off the light emitting element. At 606B a second squared wave control voltage comprising an inverse of a first squared wave control voltage is applied to the second modulation switch to provide a reverse bias across the light emitting element at the frequency.

At 608 a first modulated light signal is emitted from the light emitting element at the frequency. In some embodiments, the first modulated light signal comprises infrared (IR) electromagnetic radiation so as not to be intrusive the visual range of the electromagnetic spectrum.

At 610 the first modulated light signal reflects off one or more nearby objects to form a second modulated light signal.

At 612 the second modulated light signal is received at a ToF sensor within the ToF imager. Upon reception of the second modulated light signal the ToF illumination time is stopped.

At 614 the ToF imager determines a phase shift between the first squared wave control voltage and the modulated electrical signal, thereby determining a distance to a point on the object or objects from where the first modulated light signal was reflected.

At 616 the DC-DC converter is disabled.

It will be appreciated that equivalent alterations and/or modifications may occur to those skilled in the art based upon a reading and/or understanding of the specification and annexed drawings. The disclosure herein includes all such modifications and alterations and is generally not intended to be limited thereby. For example, although the figures provided herein, are illustrated and described to have a particular doping type, it will be appreciated that alternative doping types may be utilized as will be appreciated by one of ordinary skill in the art.

In addition, while a particular feature or aspect may have been disclosed with respect to only one of several implementations, such feature or aspect may be combined with one or more other features and/or aspects of other implementations as may be desired. Furthermore, to the extent that the terms "includes", "having", "has", "with", and/or variants thereof are used herein, such terms are intended to be inclusive in meaning—like "comprising." Also, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated herein.

What is claimed is:

1. A driving circuit, comprising:
   a current source coupled to an input electrode of a light emitting element and configured to provide a current to the input electrode to provide a forward bias to the light emitting element; and
   a first modulation switch coupled to the input electrode of the light emitting element and configured to enable or disable the current from the driving circuit to selectively forward bias the light emitting element by switching off the first modulation switch or by switching on the first modulation switch, respectively,
   wherein the light emitting element is reverse biased when the first modulation switch is switched on.

2. The driving circuit of claim 1, further comprising a second modulation switch coupled to an output electrode of the light emitting element and configured to apply a reverse bias voltage from a second voltage source coupled to the second modulation switch through a resistive element to reverse bias the light emitting element by switching off the second modulation switch, wherein the second modulation switch is further configured to reverse bias the light emitting element when the first modulation switch is switched on, and wherein the second modulation switch is further configured to switch on when the first modulation switch is switched off to enable the current to selectively forward bias the light emitting element.

3. The driving circuit of claim 2, wherein the first modulation switch is further configured to enable the current from the driving circuit to selectively forward bias the light emitting element at a frequency to illuminate the light emitting element at the frequency.

4. The driving circuit of claim 3, wherein the second modulation switch is further configured to alternate between switching off and switching on at the frequency to reverse bias the light emitting element at the frequency.

5. The driving circuit of claim 1, the current source comprising a DC-DC converter further comprising:
an inductor coupled in series to a power switch; and
an input voltage source coupled in series with the power switch, wherein the power switch is configured to enable or disable the input voltage source by closing the power switch or opening the power switch, respectively.

6. The driving circuit of claim 1, wherein the light emitting element comprises a light emitting diode or a laser.

7. The driving circuit of claim 1, further comprising an RC circuit element configured to apply a reverse bias voltage to an output electrode of the light emitting element to reverse bias the light emitting element, the RC circuit element comprising:
a first resistor comprising a first resistor node coupled to the output electrode of the light emitting element; and
a capacitor comprising a first capacitor node coupled to the output electrode of the light emitting element,
wherein the first resistor and the capacitor are configured in parallel, and wherein the capacitor is configured to discharge to reverse bias the light emitting element when the first modulation switch is switched on.

8. The driving circuit of claim 2, the first modulation switch comprising a first n-type field-effect transistor further comprising:
a first diffusion coupled to the input electrode of the light emitting element;
a second diffusion; and
a first gate configured to receive a first control voltage to allow current flow between the first diffusion and the second diffusion, thereby diverting the current from the light emitting element through the first modulation switch to disable the light emitting element.

9. The driving circuit of claim 8, the second modulation switch comprising a second n-type field-effect transistor further comprising:
a third diffusion coupled to the output electrode of the light emitting diode;
a fourth diffusion; and
a second gate configured to receive a second control voltage to allow current flow between the third diffusion and the fourth diffusion, wherein the light emitting element is reverse biased when the second control voltage is switched off.

10. A time-of-flight detector, comprising:
a driving circuit, comprising:
a DC-DC converter configured to provide a current; and
a first modulation switch coupled to an input electrode of a light emitting element and configured to enable or disable the current from the driving circuit to selectively forward bias the light emitting element by switching off the first modulation switch or by switching on the first modulation switch, respectively,
wherein the light emitting element is reverse biased when the first modulation switch is switched on.

11. The time-of-flight detector of claim 10, the DC-DC converter further comprising:
an inductor coupled in series to a power switch; and
an input voltage source coupled in series with the power switch, wherein the power switch is configured to enable or disable the input voltage source by closing the power switch or opening the power switch, respectively.

12. The driving circuit of claim 10, further comprising a second modulation switch coupled to an output electrode of the light emitting element and configured to apply a reverse bias voltage from a second voltage source coupled to the second modulation switch through a resistive element to reverse bias the light emitting element by switching off the second modulation switch, wherein the second modulation switch is further configured to reverse bias the light emitting element when the first modulation switch is switched on, and wherein the second modulation switch is further configured to switch on when the first modulation switch is switched off to enable the current to selectively forward bias the light emitting element.

13. The time-of-flight detector of claim 12, wherein:
the first modulation switch is further configured to enable the current from the driving circuit to selectively forward bias the light emitting element at a frequency to illuminate the light emitting element at the frequency; and
the second modulation switch is further configured to alternate between switching off and switching on at the frequency to reverse bias the light emitting element at the frequency.

14. The time-of-flight detector of claim 10, wherein the first modulation switch comprises an n-type field-effect transistor, comprising:
a first diffusion coupled to the input electrode of the light emitting element;
a second diffusion; and
a first gate configured to receive a first control voltage to allow current flow between the first diffusion and the second diffusion,
thereby diverting the current from the light emitting element through the first modulation switch to disable the light emitting element.

15. The time-of-flight detector of claim 14, further comprising a second modulation switch coupled to an output electrode of the light emitting element, comprising:
a third diffusion coupled to the output electrode of the light emitting diode;
a fourth diffusion;
a second gate configured to receive a second control voltage to allow current flow between the third diffusion and the fourth diffusion, wherein the light emitting element is reverse biased when the second control voltage is switched off.

16. The time-of-flight detector of claim 14, further comprising
an RC circuit element configured to apply a reverse bias voltage to an output electrode of the light emitting element to reverse bias the light emitting element, comprising:
a resistor comprising a first resistor node coupled to the output electrode of the light emitting element; and
a capacitor configured in parallel with the resistor, comprising a first capacitor node coupled to the output electrode of the light emitting element.

17. A method of time-of-flight detection, comprising:
enabling a power switch coupled to an output power of a DC-DC converter to provide a current to a first modulation switch coupled to an input electrode of a light emitting element;
selectively disabling the first modulation switch to provide the current to the light emitting element, wherein the light emitting element is reverse biased when the current is not provided to the light emitting element;

emitting a first modulated light signal from the light emitting element at a frequency;

receiving a second modulated light signal comprising a reflection of the first modulated light signal at a time-of-flight sensor; and determining a phase shift between the first modulated light signal and the second modulated light signal to determine a distance to a point on an object from where the first modulated light signal was reflected.

18. The method of claim 17, wherein the first modulation switch is further configured to provide an AC source to the light emitting element to produce the first modulated light signal at the frequency by closing the first modulation switch or by opening the first modulation switch, respectively, at the frequency.

19. The method of claim 17, wherein an output electrode of the light emitting element is coupled to a first node of an RC circuit element comprising a resistor and a capacitor configured in parallel, wherein the RC circuit element provides a reverse bias voltage to an output electrode of the light emitting element to reverse bias the light emitting element when the first modulation switch is enabled.

20. The method of claim 17, further comprising coupling an output electrode of the light emitting element to a second modulation switch configured to apply a reverse bias voltage to the output electrode of the light emitting element to selectively reverse bias the light emitting element at the frequency when the second modulation switch is switched off, wherein the second modulation switch is further configured to reverse bias the light emitting element when the first modulation switch is enabled.

* * * * *